US010030532B2

(12) United States Patent
Eastman et al.

(10) Patent No.: US 10,030,532 B2
(45) Date of Patent: Jul. 24, 2018

(54) ABRADABLE SEAL WITH THERMALLY CONDUCTIVE MICROSPHERES

(71) Applicant: United Technologies Corporation, Hartford, CT (US)

(72) Inventors: Scott Alan Eastman, Glastonbury, CT (US); Changsheng Guo, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 119 days.

(21) Appl. No.: 14/692,786

(22) Filed: Apr. 22, 2015

(65) Prior Publication Data
US 2016/0312897 A1  Oct. 27, 2016

(51) Int. Cl.
| F16J 15/44 | (2006.01) |
| F01D 11/12 | (2006.01) |
| C08K 7/24 | (2006.01) |

(52) U.S. Cl.
CPC .............. *F01D 11/122* (2013.01); *C08K 7/24* (2013.01); *F01D 11/127* (2013.01); *F16J 15/444* (2013.01); *F01D 11/125* (2013.01); *F05D 2240/55* (2013.01); *F05D 2300/10* (2013.01); *F05D 2300/43* (2013.01); *F16J 15/44* (2013.01); *Y02T 50/671* (2013.01)

(58) Field of Classification Search
CPC ...... F01D 11/12; F01D 11/122; F01D 11/125; F01D 11/127; F16J 15/44; F16J 15/444
USPC ........................................ 277/415; 415/173.4
See application file for complete search history.

(56) References Cited

U.S. PATENT DOCUMENTS

| 3,503,783 | A |  | 3/1970 | Evans |
| 4,423,097 | A | * | 12/1983 | Mons ....................... C22C 32/00 277/415 |
| 4,460,185 | A | * | 7/1984 | Grandey ............... F01D 11/122 277/415 |
| 4,566,700 | A | * | 1/1986 | Shiembob ............... C23C 28/00 277/415 |
| 4,582,534 | A |  | 4/1986 | Torobin |
| 4,621,024 | A |  | 11/1986 | Wright |
| 4,643,407 | A | * | 2/1987 | Zirk ....................... F16F 9/0409 267/122 |

(Continued)

FOREIGN PATENT DOCUMENTS

| DE | 10221114 | 9/2003 |
| EP | 0726922 | 8/1996 |

(Continued)

OTHER PUBLICATIONS

European Search Report for European Patent Application No. 16162154 completed Aug. 31, 2016.

(Continued)

*Primary Examiner* — Nicholas L Foster
(74) *Attorney, Agent, or Firm* — Carlson, Gaskey & Olds, P.C.

(57) ABSTRACT

An abradable seal includes a seal element that is formed of a polymer matrix with thermally conductive microspheres dispersed through the polymer matrix. The polymer matrix has a polymer matrix thermal conductivity and the microspheres have a microsphere thermal conductivity that is greater than the polymer matrix thermal conductivity.

17 Claims, 3 Drawing Sheets

(56) References Cited

U.S. PATENT DOCUMENTS

| | | | |
|---|---|---|---|
| 5,304,032 A * | 4/1994 | Bosna | C23C 4/18 |
| | | | 415/173.4 |
| 5,388,959 A | 2/1995 | Forrester et al. | |
| H0001447 H | 6/1995 | Linton | |
| 5,702,111 A * | 12/1997 | Smith | F16J 15/064 |
| | | | 277/650 |
| 6,334,617 B1 * | 1/2002 | Putnam | C09K 3/1018 |
| | | | 277/415 |
| 6,352,264 B1 | 3/2002 | Dalzell, Jr. et al. | |
| 6,899,339 B2 | 5/2005 | Sanders et al. | |
| 6,916,529 B2 | 7/2005 | Pabla et al. | |
| 2004/0137259 A1 * | 7/2004 | Pabla | C23C 4/02 |
| | | | 428/650 |
| 2007/0134411 A1 | 6/2007 | Cont et al. | |
| 2008/0166563 A1 | 7/2008 | Brittingham et al. | |
| 2009/0178410 A1 | 7/2009 | Straza | |
| 2011/0293958 A1 | 12/2011 | Benkoski et al. | |
| 2015/0337668 A1 * | 11/2015 | Strock | C08K 7/28 |
| | | | 415/200 |
| 2016/0222813 A1 * | 8/2016 | Guo | F04D 29/321 |
| 2016/0326899 A1 * | 11/2016 | Bogue | F01D 11/122 |

FOREIGN PATENT DOCUMENTS

| | | |
|---|---|---|
| EP | 2196632 | 6/2010 |
| WO | 2014130211 | 8/2014 |

OTHER PUBLICATIONS

Patchan, Marcia W. et al. "Liquid-Filled Metal Microcapsules," Research and Exploratory Development Department, Applied Physics Laboratory, The Johns Hopkins University, American Chemical Society, 2012, pp. 2406-2412.

* cited by examiner

ABRADABLE SEAL WITH THERMALLY CONDUCTIVE MICROSPHERES

BACKGROUND

Polyimide foam is used as an abradable seal in sections of a compressor of a gas turbine engine. For example, the foam is mounted on a static case or vane structure. The compressor rotor includes a knife edge that contacts the foam. The knife edge abrades the foam to form a groove that provides a tight clearance and limits gas leakage.

SUMMARY

An abradable seal according to an example of the present disclosure includes a seal element formed of a polymer matrix with microspheres dispersed through the polymer matrix. The polymer matrix has a polymer matrix thermal conductivity and the microspheres have a microsphere thermal conductivity that is greater than the polymer matrix thermal conductivity.

In a further embodiment of any of the foregoing embodiments, the polymer matrix is polyimide-based.

In a further embodiment of any of the foregoing embodiments, the microspheres have an interior cavity.

In a further embodiment of any of the foregoing embodiments, rein the interior cavity is hollow.

In a further embodiment of any of the foregoing embodiments, the interior cavity includes a liquid.

In a further embodiment of any of the foregoing embodiments, the liquid is selected from the group consisting of lubricating fluids, machine oils, natural oils, water, surfactant solutions, ionic liquids, and combinations thereof.

In a further embodiment of any of the foregoing embodiments, the microspheres are formed of a metal selected from the group consisting of platinum, gold, silver, palladium, copper, nickel, zirconium, aluminum, iron, antimony, bismuth, beryllium, zinc, and combinations thereof.

In a further embodiment of any of the foregoing embodiments, the microspheres have a multi-layer wall including a support layer and a metallic layer on the support layer.

In a further embodiment of any of the foregoing embodiments, the support layer is formed of at least one of a polymer-based material or a ceramic-based material.

A further embodiment of any of the foregoing embodiments includes a lattice embedded in the polymer matrix. The lattice has a lattice thermal conductivity that is greater than the polymer matrix thermal conductivity.

In a further embodiment of any of the foregoing embodiments, the lattice is formed of a metal selected from the group consisting of platinum, gold, silver, palladium, copper, nickel, zirconium, aluminum, iron, antimony, bismuth, beryllium, zinc, and combinations thereof.

In a further embodiment of any of the foregoing embodiments, the lattice is a honeycomb structure.

In a further embodiment of any of the foregoing embodiments, the lattice has a multi-layer wall including a support wall and a metallic wall on the support wall.

In a further embodiment of any of the foregoing embodiments, the support wall is formed of a polymer-based material.

A further embodiment of any of the foregoing embodiments includes an additional seal element including a metallic seal edge that is in contact with the seal element.

An abradable seal according to an example of the present disclosure includes a rotor that has a first seal element, and a static structure situated around the rotor. The static structure includes a second seal element in contact with the first seal element such that upon rotation of the rotor, contact between the first seal element and the second seal element generates friction heat. One of the first seal element or the second seal element includes a seal edge formed of a metal alloy that is sensitive to the friction heat with respect to a phase transition of the metal alloy. The other of the first seal element or the second seal element includes a polymer matrix with microspheres dispersed there through. The polymer matrix has a polymer matrix thermal conductivity and the microspheres have a microsphere thermal conductivity that is greater than the polymer matrix thermal conductivity such that the microspheres thermally conduct the friction heat away from the seal edge.

In a further embodiment of any of the foregoing embodiments, the metal alloy is a titanium alloy, and the phase transition is from alpha phase to beta phase.

In a further embodiment of any of the foregoing embodiments, the microspheres have an interior cavity and a liquid in the interior cavity. The liquid is selected from the group consisting of lubricating fluids, machine oils, natural oils, water, surfactant solutions, ionic liquids, and combinations thereof. The microspheres are formed of a metal selected from the group consisting of platinum, gold, silver, palladium, copper, nickel, zirconium, aluminum, iron, antimony, bismuth, beryllium, zinc, and combinations thereof.

In a further embodiment of any of the foregoing embodiments, the microspheres have a multi-layer wall including a support layer and a metallic layer on the support layer, and the support layer is formed of at least one of a polymer-based material or a ceramic-based material.

A further embodiment of any of the foregoing embodiments includes a lattice embedded in the polymer matrix. The lattice has a lattice thermal conductivity that is greater than the polymer matrix thermal conductivity, and the lattice is a honeycomb formed of a metal selected from the group consisting of platinum, gold, silver, palladium, copper, nickel, zirconium, aluminum, iron, antimony, bismuth, beryllium, zinc, and combinations thereof.

BRIEF DESCRIPTION OF THE DRAWINGS

The drawings that accompany the detailed description can be briefly described as follows. Like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
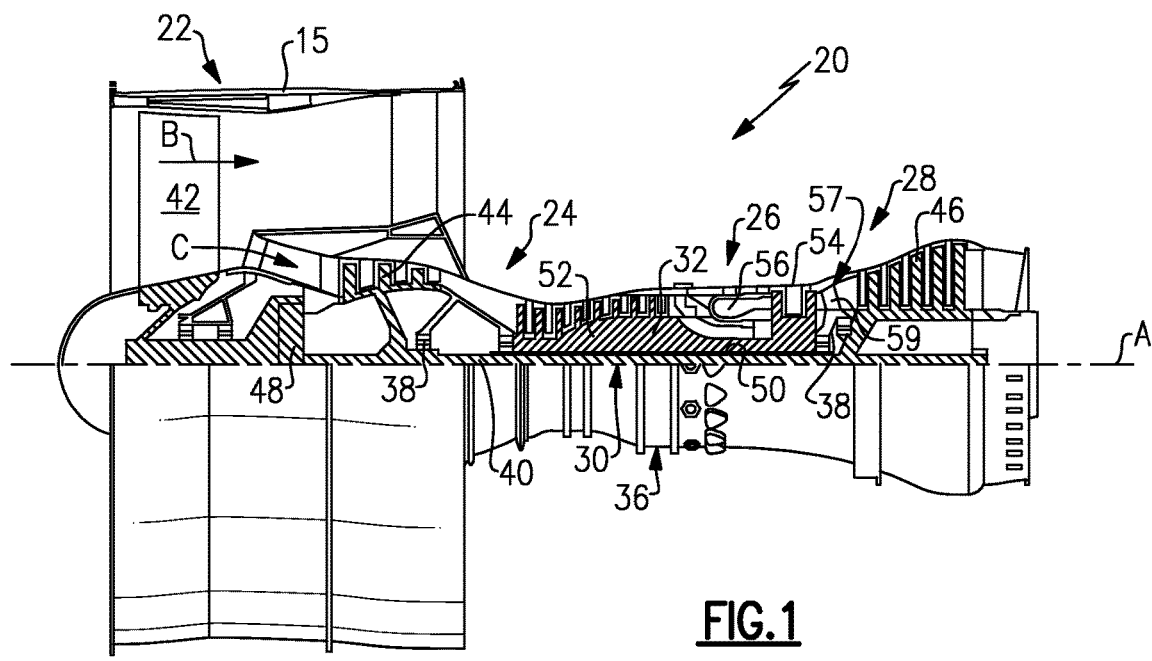
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]0.5$. The "Low corrected fan tip speed" as disclosed herein according to one non-limiting embodiment is less than about 1150 ft/second.

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors schematically indicated at 46a. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors 46a in the low pressure turbine 46 and the number of blades in the fan section 22 discloses an example gas turbine engine 20 with increased power transfer efficiency.

Figure 2:
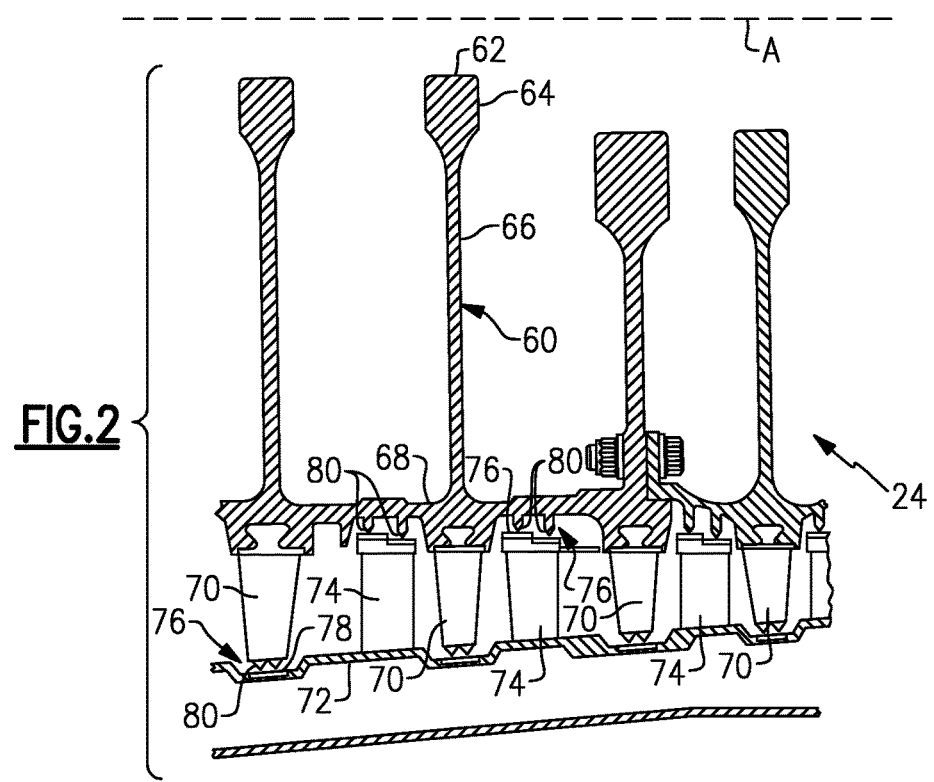
FIG. 2 illustrates a representative portion of the compressor section of the gas turbine engine of FIG. 1.

FIG. 2 illustrates a representative portion of the compressor section 24 of the gas turbine engine 20. The representative portion can be in the low pressure compressor 44, the high pressure compressor 52, or both. The compressor section 24 includes a rotor 60, which may be formed of one or more axial rotor segments that are secured together. The rotor 60 generally includes an inner bore 62 formed by an enlarged inner rim 64 and a web 66 that extends radially outwards from the inner rim 64 to an outer rim 68. The outer rim 68 can include mounting features, such as slots, for supporting circumferential rows of compressor blades 70. Alternatively, the rotor 60, or rotor segments, and the blades 70 may be integrally formed. An outer case 72 supports circumferential rows of vanes 74 that extend in between the rows of blades 70. The outer case 72, the vanes 74, or both in combination may be regarded as a static structure.

The compressor 24 further includes one or more abradable seals 76 to reduce leakage of core gas path flow around the tips of the blades 70 and/or vanes 74. In the illustrated example, the abradable seals 76 are shown at the tips of the blades 70 and also at the tips of the vanes 74. However, the locations of the abradable seals 76 are not limited, and the abradable seals 76 may be used at selected locations depending on the sealing requirements of a given implementation.

Figure 3:
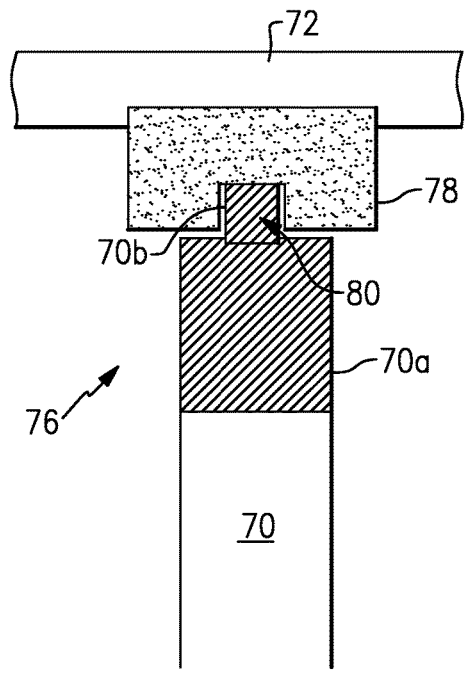
FIG. 3 illustrates an isolated view of an abradable seal in the compressor section of the gas turbine engine.

FIG. 3 illustrates an isolated view of one of the abradable seals 76 in the region near the tip one of the blades 70. The abradable seal 76 includes a first seal element 78 and a second seal element 80 that contacts the first seal element 78. In this example, the first seal element 78 is mounted on the case 72, and the second seal element 80 is mounted at the tip of the blade 70. In abradable seals 76 at the vanes 74, the first seal element 78 is mounted on the tip of the vanes 74 and the second seal element 80 is mounted on an axial arm of the outer rim 68 of the rotor 60.

The first seal element 78 is abradable and the second seal element 80 is abrasive with respect to the first seal element 78, although the respective abradable and abrasive materials used for each seal element 78/80 could be switched such that the first seal element 78 would be abrasive and the second seal element 80 would be abradable. However, in many instances, the abrasive will be used on the rotatable component.

Upon rotation of the rotor 60, the contact between the first seal element 78 and the second seal element 80 generates friction heat that increases the temperature in the region of the tips of the blades 70 and tips of the vanes 74. If the temperature is not managed, it may exceed a phase transition temperature of a metallic material that is used at the tips of the blades 70 or the tips of the vanes 74. For example, at least tip portion 70a of blade 70 (or vane 74) includes a seal edge 70b. The tip portion 70a, the seal edge 70b, or both can include a titanium alloy material. The microstructure of the titanium alloy substantially includes alpha phase titanium. However, if the temperature exceeds the phase transition temperature of the alpha phase, beta phase can form. The beta phase has different, and often less desirable, properties than the alpha phase. In this regard, to facilitate the dissipation of heat away from the tip region of the blades 70 and vanes 74, the first seal element 78 is composed of a material with enhanced thermal conductivity. For example, the thermal conductivity of the first seal element 78 is greater than the thermal conductivity of the tip region of the blades 70 and vanes 74, to ensure that heat conduction away from the tips.

Additionally, the blades 70 and/or vanes 74 can include other materials that may also be temperature-sensitive. For example, the inboard portion of the blades 70 and/or vanes 74 can be formed of an aluminum alloy that may be sensitive to increases in temperature. Furthermore, portions of the blades 70 and/or vanes 74 may also be coated with a polymeric, erosion-resistant coating, and managing the temperature increase may also reduce the potential for delamination of such coatings.

Figure 4:
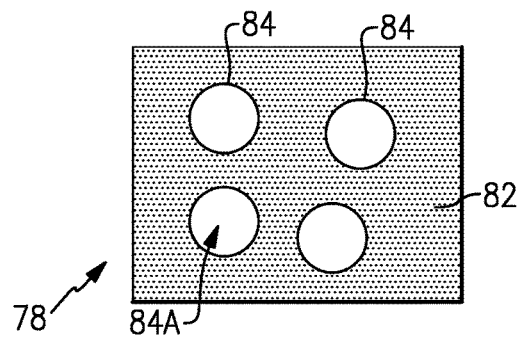
FIG. 4 illustrates a representative portion of a seal element of an abradable seal.

FIG. 4 illustrates a cross-section of a representative portion of the abradable material of the first seal element 78. The structures shown in this disclosure are for descriptive purposes and are not to scale or proportion. In this example, the material of the first seal element 78 includes a polymer matrix 82 with thermally conductive microspheres 84 (hereafter "microspheres") dispersed through the polymer matrix 82. The polymer matrix 82 has a polymer matrix thermal conductivity and the microspheres 84 have a microsphere thermal conductivity that is greater than the polymer matrix thermal conductivity. For example, the microsphere thermal conductivity is more than two times greater than the polymer matrix thermal conductivity. That is, the first seal element 78 has a greater unit thermal conductivity than the polymer alone. The microspheres 84 can have a diameter in a range of 0.1-200 micrometers, or more specifically in a range of 5-100 micrometers. In many instances in use in the compressor 24, the polymer matrix 82 is polyimide-based, although other types of polymer could alternatively be used. For example, the polyimide-based material is an open-cell foam.

In further examples, the microspheres 84 include one or more metals to provide enhanced thermal conductivity through the first seal element 78. The microspheres 84 may or may not be formed exclusively of the metal or metals. In further examples, the metal is selected from platinum, gold, silver, palladium, copper, nickel, zirconium, aluminum, iron, antimony, bismuth, beryllium, zinc or combinations or alloys thereof. In addition to thermal conductivity, the given metals can also be selected for resistance to oxidation corrosion or the like at a given environmental conditions in the compressor 24.

In additional examples, the material includes, by weight, 40-99% of the polymer matrix 82 and 1-60% of the microspheres 84. In a further example, the material includes 75-95% of the polymer matrix 82 and 5-25% of the microspheres 84. For example, the relative amounts of the polymer matrix 82 and microspheres 84 can be adjusted to provide a desired density and abradability. Additionally, the polymer matrix 82 can be a solid polymer or a foam to achieve, respectively, a higher or a lower overall density of the first seal element 78. In further examples, the first seal element 78 can include additional fillers to further modify the properties thereof.

In this example, the microspheres 84 include a single-layer wall of the selected metal or metals enclosing an interior cavity 84a. For example, the interior cavity 84a is hollow and generally free of any solid or liquid substances, but may include one or more gases.

Figure 5:
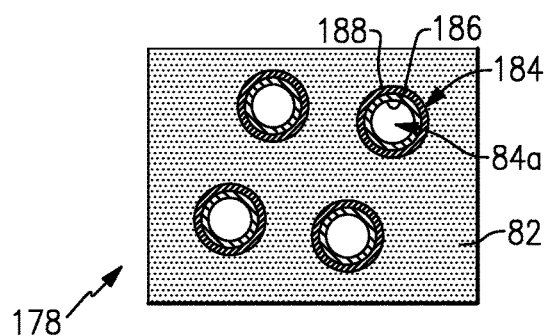
FIG. 5 illustrates a representative portion of another example abradable seal that includes multi-layer wall microspheres.

FIG. 5 illustrates a cross-section of a representative portion of an abradable material of another example first seal element 178. In this example, the material includes (thermally conductive) microspheres 184 that have a multi-layer wall that includes a support layer 186 and a metallic layer 188 on the support layer 186. For example, the metallic layer 188 is of one or more of the metals described above with regard to the microspheres 84. The support layer 186 can be formed of at least one of a polymer-based material or a ceramic-based material, or some metallic microspheres 184 of polymer-based material and others of ceramic-based material. The support layer 186 provides a relatively strong structure for supporting a thin coating layer of metal as the metallic layer 188. In this regard, a minimal amount of the metal or metals can be used to reduce weight. For example, the radial thickness of the metallic layer 188 can be less than one micrometer. In further examples, the thickness can be 1-200 nanometers.

Figure 6:
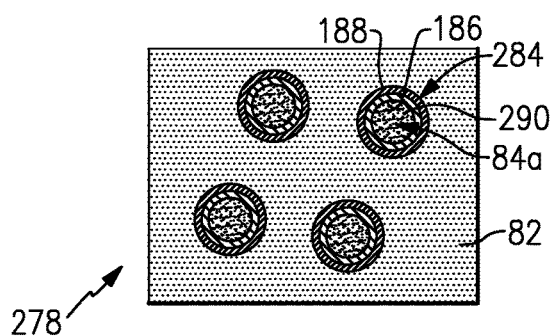
FIG. 6 illustrates a representative portion of another example seal element with microspheres that contain a liquid in the interior cavity.

FIG. 6 illustrates a cross-section of a representative portion of an abradable material of another example first seal element 278. In this example, the first seal element 278 includes the polymer matrix 82 and (thermally conductive) microspheres 284. The microspheres 284 are the same as the microspheres 184 with the exception that rather than having a hollow interior cavity 84a, the interior cavity 84a includes a liquid 290. For example, the liquid 290 can be selected to enhance the performance of the first seal element 278, such as to provide lubrication or further enhance thermal conductivity compared to hollow microspheres. In this regard, the liquid 290 can include lubricating fluids, machine oils, natural oils, water, surfactant solutions, ionic liquids or combinations thereof, such that upon abrasion of the first seal element 278, and fracture of the microspheres 284, the liquid 290 releases from the interior cavity 84a to provide lubrication at the contact interface.

Figure 7A:
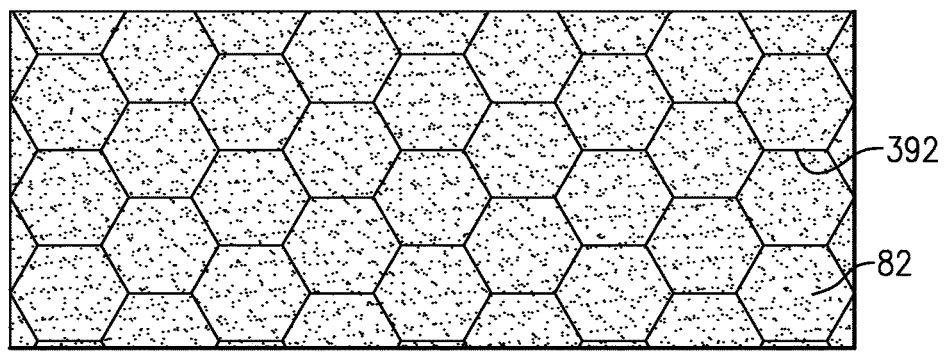
FIGS. 7A and 7B illustrate representative portions of another example seal element that includes an enhanced thermal conductivity material lattice.
Figure 7B:
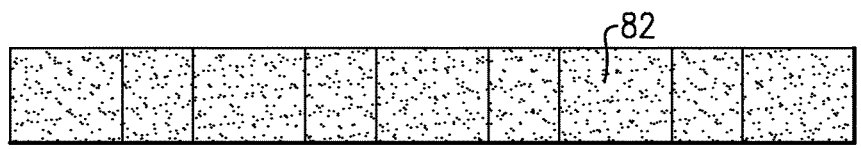

FIG. 7A illustrates a representative portion of another example first seal element 378 from a radial view, and FIG. 7B illustrates a cross-sectional view of the first seal element 378. In this example, the first seal element 378 can include the abradable material as described herein, but also includes a lattice 392 embedded in the polymer matrix 82. The lattice 392 has a lattice thermal conductivity that is greater than the polymer matrix thermal conductivity and in some examples is more than two times greater. That is, the first seal element 378 has a greater unit thermal conductivity than the polymer alone. The lattice 392 provides an additional thermal conduction path to serve for heat removal from the tip region of the blade 70 or vane 74. As an example, as shown, the lattice 392 can have a honeycomb geometry with hexagonal cells. The cell walls can be formed of one or more metals, which can include platinum, gold, silver, copper, nickel, zirconium, aluminum, or combinations thereof. The lattice 392 has a single-layer wall structure. The single-layer wall is formed of the selected metal or metals.

Figure 8:
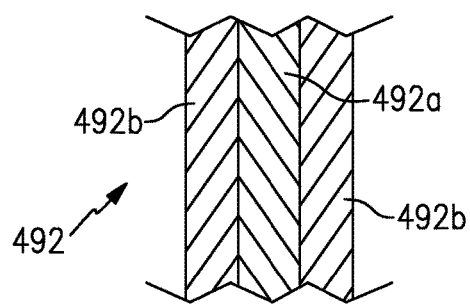
FIG. 8 illustrates a representative portion of an alternative wall structure of a lattice 492.

FIG. 8 illustrates a representative portion of an alternative wall structure of a lattice 492. In this example, the lattice 492 has a multi-layer wall structure that includes a support wall 492a situated between two metallic walls 492b. For example, the support wall 492a forms a cellular structure, which is metallized to form the metallic walls 492b. The support wall 492a can be formed of a polymer-based material, to reduce weight, while the metallic walls 492b provide good thermal conductivity. For example, the polymer-based material is a polyimide-based material.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An abradable seal comprising:
a seal element formed of a polymer matrix with microspheres dispersed through the polymer matrix, the polymer matrix having a polymer matrix thermal conductivity and the microspheres having a microsphere thermal conductivity that is greater than the polymer matrix thermal conductivity, wherein the microspheres are formed of a metal selected from the group consisting of platinum, gold, silver, palladium, copper, zirconium, iron, and antimony, bismuth, beryllium, and combinations thereof, wherein the microspheres have an interior cavity that includes an ionic liquid.

2. The abradable seal as recited in claim 1, wherein the polymer matrix is polyimide-based.

3. The abradable seal as recited in claim 1, wherein the microspheres have a multi-layer wall including a support layer and a metallic layer on the support layer.

4. The abradable seal as recited in claim 3, wherein the support layer is formed of at least one of a polymer-based material or a ceramic-based material.

5. The abradable seal as recited in claim 1, further comprising a lattice embedded in the polymer matrix, the lattice having a lattice thermal conductivity that is greater than the polymer matrix thermal conductivity.

6. The abradable seal as recited in claim 5, wherein the lattice is formed of a metal selected from the group consisting of platinum, gold, silver, palladium, copper, nickel, zirconium, aluminum, iron, antimony, bismuth, beryllium, zinc, and combinations thereof.

7. The abradable seal as recited in claim 5, wherein the lattice is a honeycomb structure.

8. The abradable seal as recited in claim 5, wherein the lattice has a multi-layer wall including a support wall and a metallic wall on the support wall.

9. The abradable seal as recited in claim 8, wherein the support wall is formed of a polymer-based material.

10. The abradable seal as recited in claim 1, further comprising an additional seal element including a metallic seal edge that is in contact with the seal element.

11. The abradable seal as recited in claim 1, wherein the metal is selected from the group consisting of copper, iron, and combinations thereof.

12. The abradable seal as recited in claim 1, wherein the microspheres have a multi-layer wall including a support layer and a metallic layer on the support layer, and the support layer is formed of a ceramic-based material.

13. The abradable seal as recited in claim 1, wherein the metal is selected from the group consisting of copper, iron, and combinations thereof, the microspheres have a multi-layer wall including a support layer and a metallic layer on the support layer, and the support layer is formed of a ceramic-based material.

14. An abradable seal comprising:
a rotor including a first seal element;
a static structure situated around the rotor and including a second seal element in contact with the first seal element such that upon rotation of the rotor, contact between the first seal element and the second seal element generates friction heat;
one of the first seal element or the second seal element including a seal edge formed of a metal alloy that is sensitive to the friction heat with respect to a phase transition of the metal alloy; and
the other of the first seal element or the second seal element including a polymer matrix with microspheres dispersed there through, the polymer matrix having a polymer matrix thermal conductivity and the microspheres having a microsphere thermal conductivity that is greater than the polymer matrix thermal conductivity such that the microspheres thermally conduct the friction heat away from the seal edge, wherein the microspheres are formed of a metal selected from the group consisting of platinum, gold, silver, palladium, copper, zirconium, iron, and antimony, bismuth, beryllium, and combinations thereof, wherein the microspheres have an interior cavity that includes an ionic liquid.

15. The abradable seal as recited in claim 14, wherein the metal alloy is a titanium alloy, and the phase transition is from alpha phase to beta phase.

16. The abradable seal as recited in claim 14, wherein the microspheres have a multi-layer wall including a support layer and a metallic layer on the support layer, and the support layer is formed of at least one of a polymer-based material or a ceramic-based material.

17. The abradable seal as recited in claim 14, further comprising a lattice embedded in the polymer matrix, the lattice having a lattice thermal conductivity that is greater than the polymer matrix thermal conductivity, and the lattice is a honeycomb formed of a metal selected from the group consisting of platinum, gold, silver, palladium, copper, nickel, zirconium, aluminum, iron, antimony, bismuth, beryllium, zinc, and combinations thereof.

* * * * *